United States Patent
Kropuenske et al.

[19]

[11] Patent Number: 6,051,985

[45] Date of Patent: Apr. 18, 2000

[54] HORIZONTAL CIRCUIT DRIVE ANALYZER AND METHOD OF ANALYZING THE HORIZONTAL CIRCUIT DRIVE OF A VIDEO DISPLAY

[75] Inventors: Glen Kropuenske, Humboldt; Scott A. Schlag, Sioux Falls, both of S. Dak.

[73] Assignee: Sencore, Inc., Sioux Falls, S. Dak.

[21] Appl. No.: 09/102,110

[22] Filed: Jun. 22, 1998

[51] Int. Cl.[7] ................................................ G01R 31/22
[52] U.S. Cl. ........................ 324/768; 315/408; 315/411
[58] Field of Search ................................. 324/404, 768, 324/769; 315/408, 411, 371; 348/805, 806, 194

[56] References Cited

U.S. PATENT DOCUMENTS

| | | | |
|---|---|---|---|
| 3,423,631 | 1/1969 | Geller et al. | 315/27 |
| 3,449,623 | 6/1969 | Dietz | 315/27 |
| 3,622,883 | 11/1971 | Haire | 324/158 T |
| 4,301,394 | 11/1981 | Dietz | 315/408 |
| 5,357,175 | 10/1994 | Kamada et al. | 315/411 |

Primary Examiner—Josie Ballato
Assistant Examiner—V. Nguyen
Attorney, Agent, or Firm—Patnaude & Videbeck

[57] ABSTRACT

A method and apparatus for testing the horizontal drive stage of a cathode ray tube display where the horizontal drive stage has a drive output which is directed to the base of a horizontal output transistor. In the method and apparatus, the output from the horizontal drive circuit is disconnected from the base of the horizontal output transistor and is connected to the apparatus of the present invention. The apparatus includes a load which simulates the load normally provided by the base of the horizontal output transistor. A meter differential amplifier is connected across the load and readings therefrom are projected on a display. The horizontal drive stage is then energized and readings from the display are compared to known operating requirements of the base of the horizontal output transistor.

7 Claims, 1 Drawing Sheet

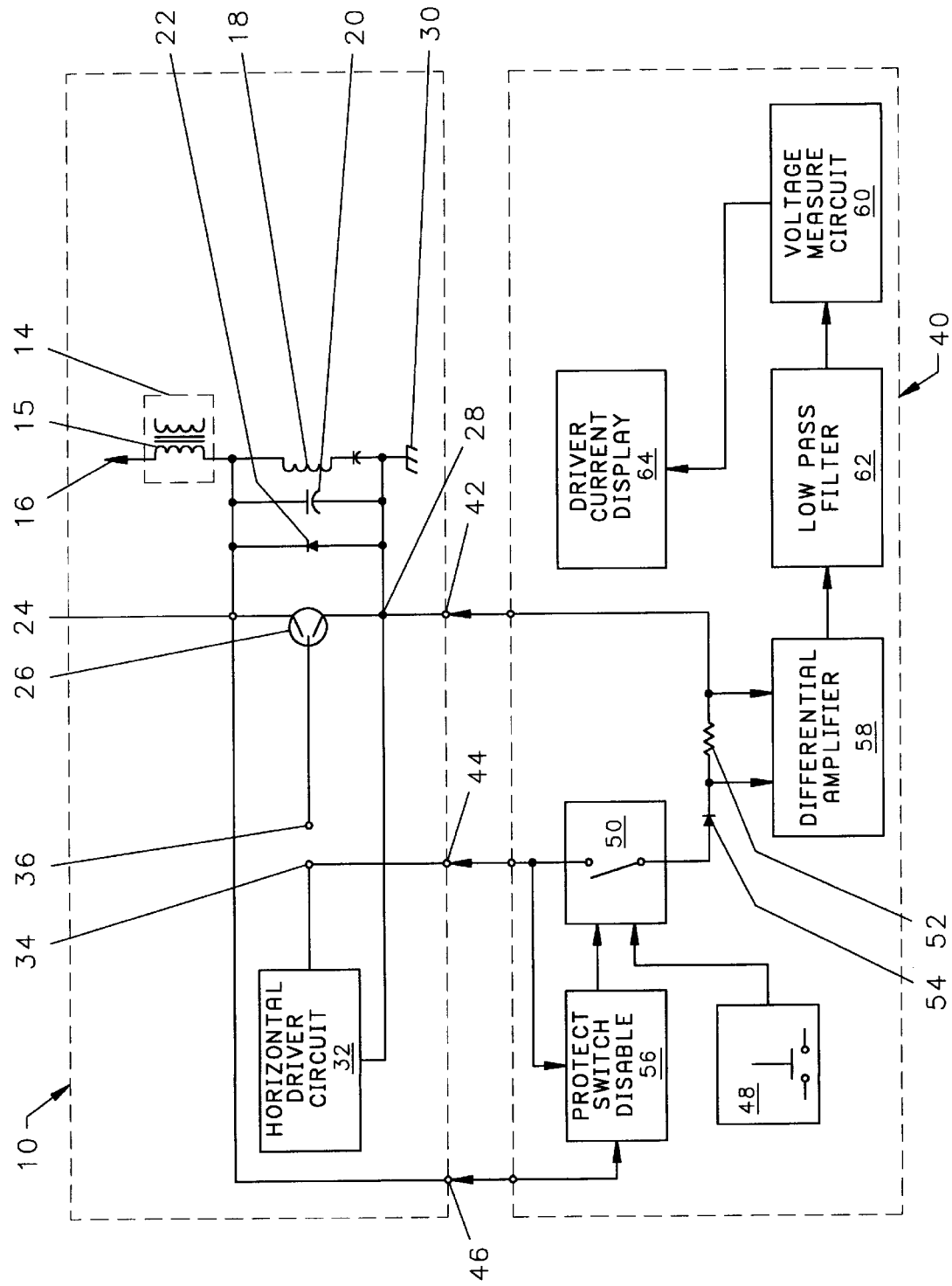

HORIZONTAL CIRCUIT DRIVE ANALYZER AND METHOD OF ANALYZING THE HORIZONTAL CIRCUIT DRIVE OF A VIDEO DISPLAY

The present invention relates to a method and instrument for analyzing the horizontal sweep circuit drive of a video display of the type used for television receivers and other CRT monitors, and it more particularly relates to a method for detecting an abnormal drive current to the horizontal sweep circuit of multifrequency video displays.

BACKGROUND OF THE INVENTION

When the horizontal output stage of a video display fails, the defective components are often replaced without first testing for defects in the horizontal drive stage. If the horizontal drive stage is in fact the cause of the failure of horizontal output stage components, the substituted components may operate for a short interval of time, allowing the display to be placed back in service, only to fail again. Multifrequency video displays are adapted to operate through a range of horizontal frequencies, and the horizontal drive stage must produce a base current to the horizontal output transistor which is suitable for the current required for each frequency at which the display operates. Displays with a wide horizontal operating range frequently have horizontal drive stages which are capable of switching between two or more levels of base current to the horizontal output transistor (H.O.T.) so that it is lower at lower frequencies and higher at high frequencies. A lower base current is needed for lower frequencies because the H.O.T. conducts for longer periods of time at the lower frequencies thereby allowing a significantly higher collector current than would occur if the same collector current were applied at higher frequencies. Two methods are commonly employed in the driver stage to switch the current level to the base of the H.O.T. One method is to change the level of the primary current in the driver transformer by changing the primary resistor which is in series with the windings of the transformer. The second method is to switch a resistor in series with the output for the driver circuit and the base of the H.O.T.

If the base current to the H.O.T. drops below its designed operating range, the H.O.T. will not provide the collector current which is normally required for proper operation of the display. The symptoms may not be detectable if the current is reduced only slightly, but more significant reductions will cause the collector current to become limited, thereby limiting the horizontal deflection. As the base current is reduced, the efficiency of the H.O.T. is correspondingly reduced, and this will cause the H.O.T. to overheat and prematurely fail.

Intermittents, or fluctuations in the driver stage output current, can also cause failure of the H.O.T. This is because intermittents cause the H.O.T. to be turned on and off at inappropriate times thereby reducing the efficiency of the H.O.T. and causing it to heat excessively.

If service personnel merely replace a defective H.O.T. and return the video display to service without first testing the driver stage output to determine if it is providing the current required for each frequency of the display and that it is not subject to intermittence, the repaired video display may again fail shortly after it is returned to service. Presently, there is no method or apparatus for testing the output of the horizontal driver stage, and it would be desirable to provide a method and apparatus for undertaking such a test. Since the horizontal output stage operates at high voltages, it would also be desirable that the instrument analyzes the equipment under test without energizing the horizontal output stage of the display to reduce the danger of shock to service personnel or damage to test equipment.

SUMMARY OF THE INVENTION

Briefly, the present invention is employed to test the horizontal drive stage of a cathode ray tube display where the horizontal drive stage has a drive output which is directed to the base of a H.O.T. To test the horizontal drive circuit, the output from the horizontal drive circuit is disconnected from the base of the H.O.T. and is connected to the apparatus of the present invention such that the apparatus of the present invention will replace the load seen by the horizontal drive circuit.

In accordance with the present invention, a load is connected between the output of the horizontal drive circuit and ground which simulates the load normally provided by the base of the H.O.T. A metering means, such as a conventional voltage measuring circuit, is connected across the load to measure the output of the horizontal drive circuit, and the readings from the metering means are thereafter projected on a display. The H.O.T. is typically a conventional bipolar or MOSFET type transistor which operates as an on and off switch. To accommodate the requirements of such transistors, the horizontal drive stage output provides a square wave having positive and negative phases which alternately switch the H.O.T. between the on and off condition. In the preferred embodiment, the load which is attached to the output of the horizontal drive stage includes a resistor in series with a Schottky diode which permits the drive current output produced by the driver stage to flow through the resistor during only the positive cycle, thereby simulating the positive drive cycle provided to the base of the H.O.T. The voltage across the resistor is proportional to the positive current from the output of the horizontal drive circuit. In the preferred embodiment, the voltage across the resistor is amplified by a differential amplifier and converted to an average DC voltage by a low pass filter and then measured by a conventional voltage measuring circuit. The voltage measurement relative to the drive current is then shown on any suitable display.

The invention further includes a protector switch circuit which monitors the collector of the H.O.T. to prevent damage to the horizontal output stage in the event the service technician did not disconnect the base of the H.O.T. from the output stage. The protector switch circuit also provides protection to the diode and the associated circuitry of the test instrument from spurious currents.

A technician can monitor the voltage output from the drive stage to determine if the correct current capacity is available to the horizontal output circuit. If the current to the base of the H.O.T. is inadequate, the technician can then troubleshoot the defective drive circuit. Similarly, if the output shows variations in voltage to the drive stage, he can troubleshoot the driver circuit for intermittent driver problems.

BRIEF DESCRIPTION OF THE DRAWINGS

The single drawing depicts a horizontal output circuit under test connected to a test instrument embodying the method of the present invention.

DETAILED DESCRIPTION OF THE PREFERRED EMBODIMENT

Referring to the drawing, the horizontal output stage 10 of a multifrequency cathode ray tube video display (the remaining portions of the display are not shown) includes a transformer 14, commonly referred to as a flyback transformer, one winding 15 of which is connected to a B+ power source 16. A yoke winding 18 is connected between ground and the opposite terminal of winding 15 of the transformer 14, and a retracing timing capacitor 20 and a dampener diode 22 are connected across the yoke 18. Connected to the junction between the yoke 18 and the winding 15 is the collector terminal 24 of a horizontal output transistor (H.O.T.) 26, the emitter terminal 28 of which is connected to ground 30.

The horizontal drive circuit 32 of the device under test has a horizontal drive output 34 which is connected to the base 36 of the H.O.T (before testing performance). To test the voltage at the horizontal drive output 34, a test apparatus 40 in accordance with the present invention is provided. The test instrument 40 includes a first connector 42 for connection to the emitter terminal 28 of the H.O.T., a second connector 44 for connection to the horizontal driver output 34 and a third connector 46 for connection to the collector terminal 24 of the H.O.T. The test instrument 40 further includes a on/off actuator button 48 which is adapted to close a switch 50 thereby placing a current sensing resistor 52 in series with a diode 54, such as a Schottky diode, between the second connector 44 and the first connector 42. A protective circuit disable switch 56 is connected between the third connector 46 and the second connector 44. The protector current disable switch 56 is also connected to the switch 50 such that any spurious voltage detected between the collector 24 of the H.O.T. 26 and the drive stage output 34 will cause the protector circuit disable switch 56 to open switch 50 thereby disconnecting the resistor 52 and the diode 54 from the circuit.

A differential amplifier 58 is connected across the current sensing resistor 52 to amplify the voltage across the resistor, and the current from the differential amplifier 58 is measured by a conventional voltage measuring circuit 60 after it is converted to DC voltage by a low pass filter 62. The voltage as measured by the circuit 60 is then shown on a suitable display 64 such as a liquid crystal display or the like.

OPERATION OF THE INVENTION

To carry out the method of the invention, power is first disconnected from the display 10 under test. Then the base 36 of the H.O.T. 26 of a display is disconnected from the horizontal drive output 34 as shown. Thereafter, the first connector 42 of the device 40 is attached to the emitter terminal 28, the second connector 44 is connected to the horizontal drive output 34 and the third connector 46 is connected to the collector terminal 24.

The method of the present invention is an active test and, therefore, power is then applied to the horizontal drive circuit after which the technician depresses the button 48 to close the switch 50 and holds the button 48 down until meaningful test readings are obtained. If there are no spurious currents detected between the connectors 42 and 46, the protection circuit will not disable the switch 50, and the resistor 52 and diode 54 will be connected between the horizontal drive output 34 and ground, thereby simulating the load imposed on the horizontal drive circuit by the base 36 of the H.O.T. The positive swing of the voltage from the horizontal drive output 34 is applied across the resistor 52 and this voltage is amplified by the differential amplifier 58. The output of the amplifier 58 is measured by the voltage measuring circuit 60 and shown on display 64. A technician can read the display 64 to determine the voltage relative to the drive current which the horizontal drive circuit applies to the base 36 of the H.O.T. and compare this voltage to specifications for the H.O.T. in a suitable reference manual. If the voltage differs from the proper operating requirements of the H.O.T. so as to be inadequate for the proper operation of the H.O.T., the technician can then troubleshoot the horizontal drive circuit 32.

After the test is completed, power should again be removed from the display being tested and connectors 42, 44, 46 should be detached from the horizontal output circuit. Thereafter, the horizontal drive output 34 should be reconnected to the base 36.

While one embodiment of the present invention has been shown and described, it will be apparent to those skilled in the art that many changes and modifications may be made without departing from the true spirit and scope of the present invention. It is the intent of the appended claims to cover all such changes and modifications which fall within the true spirit and scope of the invention.

What is claimed:

1. A method of testing the horizontal drive stage of a cathode ray tube display where said horizontal drive stage has an output and said display has an H.O.T. having a base to which said horizontal drive stage output is connected, said method comprising the steps of:

disconnecting said output from the horizontal drive stage to said base, providing a load, connecting said load to said output from the horizontal drive stage to simulate the load of said base, providing a metering means for measuring and displaying a current flow, connecting said metering means for measuring and displaying a current flow through said load, energizing said horizontal drive stage, and comparing readings from said display to known operating requirements of said base of said H.O.T.

2. The method of claim 1 and further comprising the step of providing a protective disable switch to disconnect the load from the circuit in the event spurious currents are found applied to a collector of said H.O.T.

3. Apparatus for testing the horizontal drive stage of a cathode ray display where said horizontal drive stage has an output and said display has an H.O.T. having a base to which said output is connected and an emitter, said apparatus comprising, second connector means connecting to said output of said horizontal drive stage, first connector means connecting to said emitter, a load between said first connector and said second connector, said load simulating the load of said base when said second connector is connected to said output of said horizontal drive stage and said first connector is connected to said emitter, and a metering means for measuring current flowing through said resistor.

4. The apparatus of claim 3 wherein said load comprises a diode and a resistor.

5. The apparatus of claim 3 wherein said H.O.T. further comprises an emitter and said apparatus further comprises, third connector means for connection to said emitter, and protect disable switch means connected to said third connector for protecting said load when said third connector is connected to said emitter and a spurious current is detected in said emitter.

6. The apparatus of claim 3 wherein said metering means comprises a means for displaying a measurement of current in said resistor.

7. The apparatus of claim 3 wherein said metering means comprises an amplifier, a voltage measuring circuit, and a display.

* * * * *